US006511737B1

(12) United States Patent
Fernandez-Kirchberger

(10) Patent No.: US 6,511,737 B1
(45) Date of Patent: Jan. 28, 2003

(54) PRINTABLE SHEET OF MATERIAL

(75) Inventor: Paul Fernandez-Kirchberger, Berg (DE)

(73) Assignee: PROMAXX® Cards Vertriebs GmbH, Munich (DE)

( * ) Notice: Subject to any disclaimer, the term of this patent is extended or adjusted under 35 U.S.C. 154(b) by 65 days.

(21) Appl. No.: 09/667,055

(22) Filed: Sep. 21, 2000

(30) Foreign Application Priority Data

Sep. 23, 1999 (DE) .................................... 299 16 810 U

(51) Int. Cl.$^{7}$ .......................... B32B 29/00; B32B 3/00; B32B 7/00

(52) U.S. Cl. ....................... 428/211; 428/217; 428/219; 428/342; 428/537.5

(58) Field of Search ................................ 428/194, 195, 428/211, 217, 342, 537.2, 219; 503/200

(56) References Cited

U.S. PATENT DOCUMENTS 5,427,416 A * 6/1995 Birch ......................... 283/109

FOREIGN PATENT DOCUMENTS

DE 42 40 825 C2 6/1994

* cited by examiner

*Primary Examiner*—Bruce H. Hess
*Assistant Examiner*—B. Shewareged
(74) *Attorney, Agent, or Firm*—Muramatsu & Associates

(57) ABSTRACT

A printable sheet of material for a printing machine allows smooth entry into a printing machine and firm grips by transport rollers. The printable sheet has impressions or perforations at the end portion from which the printable sheet is inserted to the printing machine. The impressions or perforations provide reduced stiffness thereby allowing papers with heavy weight to be used in a printing machine.

8 Claims, 1 Drawing Sheet

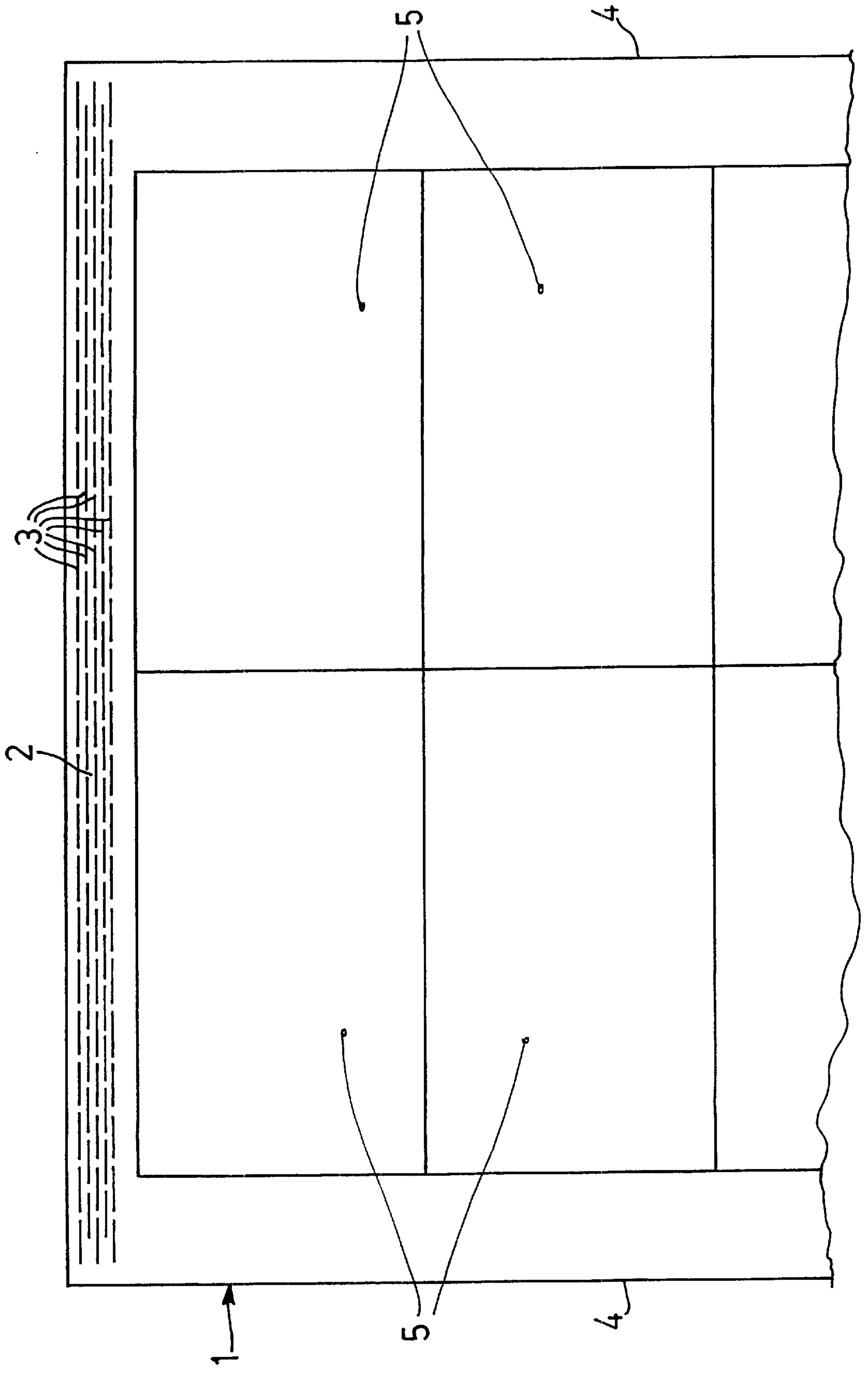
5
4
3
2
1
5
4

PRINTABLE SHEET OF MATERIAL

FIELD OF THE INVENTION

This invention relates to printable sheets of material. More particularly, this invention relates to printable sheets of material having a weight of at least 160 g/$m^2$ to be inserted into a printing machine for printing.

BACKGROUND OF THE INVENTION

The need for the mechanical printing of sheets of paper, cardboard or other materials is well known from practice. This is also effected especially by using conventional printing machines, laser printers, photocopying machines and other known printing and writing machines.

From time to time it is desired to use sheets of material that are as strong as possible, for example cardboard having a weight of at least 160 g/$m^2$, preferably cardboard having a weight of from 220 to 300 g/$m^2$. This is the case, for example, when sheets of cardboard having punched fields are to be used to produce visiting cards, as known, for example, from German patent No. DE 42 40 825.

However, such sheets of material, especially sheets of cardboard weighing more than 160 g/$m^2$, can often not be drawn in and printed by conventional printing machines, especially conventional ink-jet or laser printers, or not without defects.

The reason resides in the fact that the relative stiffness and smoothness of the sheets of material at their ends often stands in the way of a perfect entry of the sheets of material at the printer inlet. The transport rollers used in printers cannot grip and transport the sheets of material cleanly when the ends of those sheets are too stiff and/or too smooth and/or do not come to rest in the ideal position between the transport rollers.

Although it is often possible in such cases to assist entry into the printer by feeding the sheets of material in manually, jamming of a printing sheet that is difficult to clear may occur time and time again inside the printer. Accordingly, there is a need for a printable sheet of material that is capable of smooth entry into a printing machine.

SUMMARY OF THE INVENTION

An object of the present invention is therefore to provide a sheet of material which, even at a weight of more than 160 g/$m^2$, can be drawn in and printed by conventional printing machines in a faultless manner. This is achieved by reducing stiffness at an end from which the sheet in inserted into a printing machine. The reduced stiffness provides smooth and easy entry into printing machines and allows firm grips by transport rollers in the printing machine.

BRIEF DESCRIPTION OF THE DRAWINGS

FIG. 1 is an illustration of a printing sheet of the present invention having rows of cuts at one end for smooth entry into a printing machine.

DETAILED DESCRIPTION OF THE INVENTION

The present invention is explained with reference to FIG. 1. As shown in FIG. 1, the end portion 1 of the print sheet 1 has perforations in the form of punched cuts 3 which extend substantially parallel with the outer edge of that portion and which lie closely next to one another and behind one another. In the embodiment illustrated in the drawing, five rows of punched cuts are provided and are arranged one behind the other.

The printable sheet of material may be manufactured from cardboard material having a weight of at least 160 g/$m^2$, preferably having a weight of more than 220 g/$m^2$. Such heavy cardboard material is preferably used when the printable sheet of material contains fields to be printed that are to be used as visiting cards or as other identifying means.

The punched cuts 3 are arranged in a line next to one another and in an offset manner behind one another. In the embodiment shown, five rows of punched cuts are provided and extend parallel with the end edge of the sheet of material, each of the punched cuts having a length of 8 mm and a spacing between rows of 1.5 mm. With such an arrangement, the stiffness of a sheet of material weighing 220 g/$m^2$ is reduced in the perforated portion to the stiffness of a sheet of material weighing 160 g/$m^2$. This is found to be sufficient to ensure trouble-free entry and passage of the sheet of material in conventional printing machines.

Although five rows of punched cuts are provided in the preferred embodiment, the rows may be as few as three as long as they reduce stiffness of the printable sheet to allow smooth entry into a printing machine.

In order not to jeopardize the stability of the sheet of material in the end portion, the punched cuts 3 are preferably arranged with a spacing of at least 2.5 mm from the end edge of the sheet of material and at least 3 mm from the side edges 4 of the sheet of material 1. There is then no risk that the sheet of material will be damaged either when it is drawn into the printing machine or when it subsequently runs through the printing machine.

The sheet of material illustrated in FIG. 1 has punched fields 5 which, in the printed state, can be used as visiting cards. Depending on the intended use of the printable sheet of material, it is also possible to provide other types of field in the printable sheet of material according to the invention or to leave the printable sheet of material in one piece, that is to say, to provide no separated fields.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. Printable sheet of material comprising:

impressions or perforations provided at an end portion of the printable sheet that is first introduced into a printing machine to reduce stiffness at the end portion, thereby facilitating its introduction into the printing machine.

2. Printable sheet of material to be inserted into a printing machine, comprising:

a plurality of cuts provided at an end portion of the printable sheet that is first introduced into the printing machine, said cuts extending substantially parallel with the outer edge of end portion and lying closely next to one another and behind one another to reduce stiffness at the end portion, thereby facilitating introduction of the printable sheet into the printing machine.

3. Printable sheet of material according to claim 1, wherein at least three rows of impressions or perforations are provided behind one another at the end portion.

4. Printable sheet of material according to claim 2, wherein at least three rows of cuts are provided behind one another at the end portion.

5. Printable sheet of material according to claim 1, wherein the printable sheet is manufactured from cardboard material weighing at least 160 $g/m^2$.

6. Printable sheet of material according to claim 2, wherein the printable sheet is manufactured from cardboard material weighing at least 160 $g/m^2$.

7. Printable sheet of material according to claim 1, wherein the printable sheet is manufactured from cardboard material weighing between 220 to 300 $g/m^2$.

8. Printable sheet of material according to claim 2, wherein the printable sheet is manufactured from cardboard material weighing between 220 to 300 $g/m^2$.

* * * * *